(12) United States Patent
Schmid

(10) Patent No.: US 7,150,843 B2
(45) Date of Patent: Dec. 19, 2006

(54) PROCESS FOR THE PRODUCTION OF A SHAPED ARTICLE FROM A LIGHTWEIGHT-AGGREGATE GRANULATE AND A BINDER

(75) Inventor: Hermann Andreas Schmid, Aalen (DE)

(73) Assignee: Dennert Poraver GmbH, Postbauer-Heng (DE)

( * ) Notice: Subject to any disclaimer, the term of this patent is extended or adjusted under 35 U.S.C. 154(b) by 1 day.

(21) Appl. No.: 10/863,240

(22) Filed: Jun. 9, 2004

(65) Prior Publication Data

US 2004/0251573 A1    Dec. 16, 2004

(30) Foreign Application Priority Data

Jun. 11, 2003   (DE) ................................ 103 26 252

(51) Int. Cl.
*B29C 67/04*    (2006.01)
(52) U.S. Cl. .......................... 264/42; 264/603; 264/109
(58) Field of Classification Search ......... 264/109–128
See application file for complete search history.

(56) References Cited

U.S. PATENT DOCUMENTS 4,425,291 A    1/1984   Beer et al.
6,296,697 B1 *  10/2001  Stepanenko et al. ........ 106/604

FOREIGN PATENT DOCUMENTS

| DE | 23 18 167 A    | 10/1974 |
| DE | 32 46 502 A    | 6/1984  |
| DE | 32 46 502 A1   | 6/1984  |
| DE | 195 38 667 A1  | 10/1995 |
| DE | 44 10 242 C2   | 4/1996  |
| DE | 196 08 323 A1  | 8/1997  |
| DE | 197 02 254 A1  | 7/1998  |
| DE | 197 12 835 C2  | 9/1999  |
| DE | 199 09 077 A1  | 9/2000  |
| DE | 100 20 955 A1  | 11/2001 |
| DE | 100 22 798 A1  | 11/2001 |
| EP | 0 053 296 A    | 6/1982  |
| EP | 0 763 506 B1   | 7/1996  |
| EP | 08 93 418 B1   | 1/1999  |
| EP | 0 893 418 B    | 5/2003  |

* cited by examiner

*Primary Examiner*—Mary Lynn Theisen
(74) *Attorney, Agent, or Firm*—Browdy and Neimark, PLLC

(57) ABSTRACT

A process for the production of a shaped article from a lightweight-aggregate granulate and an inorganic binder has the following process steps:
   provision of a viscous binder that has been prepared on the basis of diatomite and caustic soda or caustic potash solution,
   mixing of the binder with lightweight-aggregate granulate,
   shaping of the lightweight-aggregate granulate binder mixture, and
   thermal exposure of the lightweight-aggregate granulate binder mixture under foaming and bonding of the lightweight-aggregate granulate particles in a foamed binder matrix to create the shaped article.

20 Claims, No Drawings

PROCESS FOR THE PRODUCTION OF A SHAPED ARTICLE FROM A LIGHTWEIGHT-AGGREGATE GRANULATE AND A BINDER

BACKGROUND OF THE INVENTION

1. Field of the Invention

The invention is concerned with a process for the production of a shaped article from a lightweight-aggregate granulate, in particular expanded-glass granulate, and a binder.

2. Background Art

Shaped articles of this type, as they are used especially in the form of boards, are suitable for a whole variety of applications. They may be used as fire barrier boards, core material for construction elements and prefabricated elements, such as fire doors, cabin walls, ceilings, and the like. Additionally, their use as non-fibrous boards in dry construction for the infill of a post-and-beam construction of non-bearing walls is a typical example of an application. Shaped articles of this type are also used as non-fibrous sound protection board, e.g., as core material for sound protection walls against street, train and air traffic noise, as well as in shooting ranges, as multi-layer broadband absorbers with slotted, punched or raised surface structures, lining in Helmholtz resonators, core material for mufflers, acoustic ceilings, and so forth.

A whole variety of shaped articles of lightweight-aggregate granulates and inorganic binder systems are known from the prior art.

In the ceramic bonding process, a powdery substance—optionally also a suspension of the same with variable liquid content—is compressed and sintered during a subsequent thermal process. From DE 44 10 242 C2, for example, it is known to repeatedly encapsulate expanded clay granules with a slip, pour the expanded clay granules that have been encapsulated in this manner into metal molds, shape and dry them, and subsequently sinter them by baking.

In the process according to DE 100 20 955 A1, a charge of lightweight-aggregate granules without added binder or flux additives is compressed and sintered. In the process, the utilized granulate post-expands with the aid of the enclosed residual propellant, whereby the spaces in the internally porous aggregate charge are closed and the contacting surfaces of the granule particles are fused with one another.

In addition to the use of hydraulic bonding systems, such as cement, lime, magnesite and plaster bonds in the presence of water and carbon dioxide, a phosphate bonding system is known from EP 0 763 506 B1. There, an expanded-glass granulate is wetted with an alkaline silicate phosphate solution, compacted, dried and hardened to produce a light insulating board.

Lastly, water glass bonds are commonly used for the production of shaped articles of lightweight-aggregate granulates and particularly expanded-glass granulates. DE 32 46 502 A1, for example, reveals the production of shaped articles bonded with water glass, wherein stability-increasing metal oxides or minerals are added to the water glass solution. In the insulating board production revealed in DE 197 12 835 C2, the wetting is carried out exclusively with liquid water glass, and the green product is subjected, after shaping and drying, to a special liquid-phase sintering.

SUMMARY OF THE INVENTION

The invention has as its object to present a process for producing a shaped article of lightweight-aggregate granulate, in particular expanded-glass granulate, wherein the inorganic binder system is prepared on the basis of an easily available natural product and, due to its surprising behavior patterns under thermal exposure, possesses advantageous bonding properties for the production of shaped articles of lightweight-aggregate granulate.

The central point of the invention is a special viscous binder, which is prepared on the basis of diatomite—a natural product—and caustic soda or caustic potash solution. Depending on the water content, a more or less viscous gel will form, which will be explained in more detail below. The principle of the preparation of this viscous binder is revealed in EP 0 893 418 A1.

In this binder, mixed with a lightweight-aggregate granulate and shaped to a desired article, water is bonded physically and chemically. The physically bonded water in particular evaporates in an explosion-like manner during a rapid thermal exposure, so that the binder matrix that is formed by the binder around the lightweight-aggregate granulate expands and creates a fine-pore foam. The same encapsulates the lightweight-aggregate particularly intimately, so that the shaped articles bonded in this manner have a comparatively high stability. Their insulation effect is also improved due to the porous binder matrix.

The preparation of the viscous binder may take place by boiling ground diatomite in caustic soda or caustic potash solution.

A variant that is more advantageous with respect to the expenditure of energy, gets by without this boiling or corresponding steam treatment. For this purpose, diatomite is dissolved in water, optionally by means of mechanical action, and sodium hydroxide is subsequently added. The viscous binder builds up—as will be explained in more detail in the description of the example embodiment.

In a preferred improvement of the inventive process, provision is made to add boric oxide, for example in the form of boric acid or borax, to the binder batch. This results in a noticeable improvement in the physical properties of the binder matrix after the thermal exposure regarding, for example, the alkali resistance and reduced water solubility. The reason for this is that stable sodium borosilicates are formed in the binder matrix.

One special feature of the diatomite-based binder lies in its wide range of adjustable viscosity. It may, for example, be prepared as a low-viscosity binder liquid with a viscosity of approximately 1 to $10^8$ mPas. This binder liquid has good wetting properties, especially for expanded-glass granulate particles and, depending on its water content and viscosity, produces a more or less thick binder coating on the granulate. In the process, however, the porous expanded-glass granulate is not, or only insignificantly, impregnated with binder, which represents an additional significant advantage compared to the wetting with water glass. In fact, due to its low viscosity, the latter is soaked up to a significant degree by the granulate and is thus not available, for example, for the liquid phase sintering described in the above-mentioned printed publication DE 197 12 835 C2 and corresponding formation of bonding links between the granulate particles.

In another preferred mode, the diatomite-based binder is to be used as a highly viscous binder granulate that is prepared by drying and granulating the boiled diatomite batch with a viscosity larger than $10^8$ mPas. For the preparation, the binder gel that is obtainable by boiling diatomite in caustic soda or caustic potash solution is dried until it passes into a solid state. The given pieces may be reduced to small pieces with a disintegrator or grinder, and fractionated by means of a sifting process into the desired particle size. If the obtainable fragments are briefly dried at a moderate temperature, a hard shell forms on the fragments and a free-flowing granulate is therefore obtained. In the interior of the granulate particles, however, sufficient moisture is still enclosed, which, during thermal exposure, in turn, results in the evaporation of the residual water and corresponding expansion of the binder granulate.

Low-viscosity binder liquid and binder granulate may be used separately in each case, but also together to prepare the bonding system in the shaped article. The given content percentages may be used to selectively control the internal porosity of the aggregate particles of the shaped article. If only a low-viscosity binder liquid is used, which encompasses the expanded-glass granulate particles with a thin coating, the degree of foaming of the binder liquid will not be sufficient to fill the internal porosity in the shaped article between the individual expanded-glass granulate particles. The percentage of internal porosity is correspondingly high. By selectively adding binder granulate with appropriate grain sizes into the mixture, the free spaces between the granulate particles of the lightweight aggregate can be filled to a greater or lesser degree. After the foaming of the binder granulate, a more or less pronounced closing of the internal pores thus results. In the case of a high percentage of high-viscosity binder granulate, the expansion of the same will result in a shaped article without internal porosity.

According to an additional preferred embodiment of the inventive process, a problem is solved that is often found in conventional production processes for shaped articles of lightweight aggregates and inorganic binder systems. For example, if ceramic binders are used prior to the actual sintering, a sufficient green bond of the shaped article is often not attained, so that the entire process must take place in appropriate molds. With the inventive binder system, this can be circumvented since, for example, for providing adhesion in a granulate mixture of lightweight aggregates, the addition of not overly viscous binder granulate and an appropriate shaping by pressing may already be sufficient to provide the shaped article produced in this manner with sufficient stability to allow it to be moved within the production set-up. This may be perfected further with the use of a preferably inorganic adhesive, especially the low-viscosity diatomite binder liquid. Specifically, if the diatomite binder liquid is used, the shaped article does not contain any foreign adhesive.

The shaped article that has been produced by thermal exposure with a foamed binder matrix may be further hardened by additional thermal exposure while sintering, preferably dry sintering, of the foamed binder matrix. This "dry sintering" takes its course without shrinkage, so that the shaped article may be produced already very close to the requested dimensions in an appropriate mold.

According to an additional preferred process step, the shaped article that has expanded in its binder matrix and optionally been sintered, may produce a selective growing of micro-crystals from the amorphous binder matrix and/or expanded-glass granulate by heat treatment. For this purpose glass powder, finely ground kaolin, zinc oxide or—preferably—tin oxide may preferably be added to the binder as crystal nuclei. The grown crystals have, within the amorphous glass matrix, a slightly differing heat expansion coefficient, causing the crystals to break out from the glass matrix and, depending on the heating time, to produce a defined micro-porosity. This defined micro-porosity permits an increased sound penetration into the shaped article and especially into the micro-pores in the binder foam, with the result that the overall construction element offers a significantly improved sound insulation. If the shaped article that has been produced according to the invention is used, for example, as filter elements, the length-specific flow resistance of a porous filter member may be fine-tuned by means of the micro-crystal growth and the corresponding adjustable micro-porosity.

Additional characteristics, advantages and details of the invention will become apparent from the following

DESCRIPTION OF EMBODIMENTS

The preparation of the binder is performed as follows:

Natural diatomite is ground dry or wet and subsequently boiled in caustic soda or caustic potash solution under admixture of glass powder (for example glass dust from the granulate production) and tin oxide as crystal nuclei. Depending on the water content, a binder liquid forms—which shall be understood to include up to a gel—with a viscosity of approximately 1 to $10^8$ mPas.

In a modified method of preparation, the boiling of the diatomite suspension may be dispensed with. In fact, it is also possible to bring diatomite into suspension in water in a ratio of 1:2 and grind it for approximately 1 hour in a ball mill. The grinding process causes the temperature of the suspension to rise to approximately 40° C.

To this pre-heated suspension, to form caustic soda, sodium hydroxide is added in the form of beads or pellets, which dissolve in an exothermic process while releasing energy. This causes the suspension to heat up further and temperatures of nearly 100° C. can be reached. If the addition and dissolving of the sodium hydroxide is performed in an insulated impeller-type mixer, this high temperature is maintained even longer, which enhances a gel formation of the binder liquid. The viscosity of this binder liquid incidentally continually increases as the water content decreases.

In an additional alternate method of preparation, the above-described grinding of the diatomite is dispensed with. Instead, a dissolving and whisking takes place in water that has preferably been preheated to 50° C., after which the sodium hydroxide is added and, for example, whisked for another 20 minutes to obtain a reactive binder gel. Only coarse components of the diatomite must advantageously be screened out from the suspension.

To improve the physical properties of the binder—especially to increase the alkali-resistance and decrease the water solubility after the subsequent sintering—the diatomite suspension may, in addition to the sodium hydroxide, also contain boric oxide in the form of boric acid or borax, which is whisked together with the sodium hydroxide in the suspension, as mentioned above.

A sample batch for the preparation of the diatomite-based binder will be described below, relative to 1 mol diatomite or 1 kg of the slightly moist diatomite with a moisture content of 32%. The melting point of this material is approximately 700° C., so that it represents a very effective, stable and easily processed binder during the sintering at a temperature of 680° C., which will be specified and explained in more detail below.

The following table 1 presents a sample batch for this binder.

| Material Designation | Chemical Formula | Molar Batch | Batch by Weight | Batch in Wt. % |
|---|---|---|---|---|
| Diatomite | $SiO_2$ | 1 mol | (diatomite slightly moist 32%) 1.000 kg | 35% |
| Water | $H_2O$ | 8 mol | 1.200 kg | 40% |
| Sodium Oxide | $Na_2O$ | 0.4 mol | 0.400 kg | 14% |
| Boric Oxide | $B_2O_3$ | 0.2 mol | 0.250 kg | 9% |

In the 3-substance-diagram $SiO_2/Na_2O/B_2O_3$ the percentage ranges of these binder components may be expressed as follows:

| Material Designation | Chemical Formula | Molar Range | Weight Range |
|---|---|---|---|
| Diatomite | $SiO_2$ | 1.0 mol | 1.000 kg |
| Water | $H_2O$ | 4.0 to 50 mol | 1 to 15 kg |
| Sodium Oxide | $Na_2O$ | 0.2 to 1 mol | 0.2 to 1 kg |
| Boric Oxide | $B_2O_3$ | 0.05 to 5 mol | 0.05 to 5 kg |

The above composition ranges in the above-mentioned 3-substance-diagram are designed such that the low-melting point compositions with melting temperatures between approximately 550 to 1000° C. are covered by them.

The low-viscosity binder liquid may—as mentioned above—be processed further by drying and granulating it into a binder granulate on diatomite basis with a viscosity above $10^8$ mPas.

As a starting point for the production of a board from expanded-glass granulate and a diatomite-based binder, expanded-glass granulate is now mixed in batches or continually in a commercially available mixing unit. The additional batch components are metered and added volumetrically or gravimetrically.

In this context, the low-viscosity binder liquid mainly serves to provide adhesion between the solid batch components, and the highly viscous binder granulate serves for the variable control of important material characteristics, such as the density, strength, internal porosity of the aggregate particles, moisture vapor diffusion coefficient, and the length-specific flow resistance.

The following percentage limits shall apply for the individual components:
  expanded-glass granulate in a grain size of 0 to 16 mm: 30 to 95% wt. %,
  high-viscosity binder granulate with solids content 50 to 90% and grain size from 0 to 10 mm: up to 70 wt. %, and
  low-viscosity binder liquid with solids content 5 to 50%: up to 50 wt. %.

The above-mentioned granulates may contain a uniform grain size, a bi-modal grain distribution, but also any randomly wide grain spectrum or mixtures of different lightweight aggregates.

The material to be mixed consisting of expanded-glass granulate and a percentage of binder may be filled loosely into a shallow mold, processed further with or without compaction, extruded with an extruder as a continues extruded strand with a ram press or sliding press into defined shaped articles close to the final dimensions, or brought into an appropriate shape of the desired member by other means. If compaction is used, the compaction pressure is advantageously in the order of magnitude of 0.1 to 10 $N/mm^2$. In this context it should be noted that after mixing the batch components, the latter are held together mainly by Van der Waal forces, after the compaction a mutual mechanical engagement between the binder matrix and granulate is additionally present—figuratively speaking—in the form of an indenting or an interlocking.

Shaped green products that have been shaped in this manner already attain sufficient stability due to the use of the high-viscosity binder granulate in particular, to be removed from the mold and transported for additional production steps. Intermediate drying steps may thus be dispensed with, rendering the inventive production process more economical and performable with less energy expenditure as compared to the prior art.

The shaped green products that are produced in this manner are treated with a relatively sudden thermal exposure by means of a hot gas treatment or also with heating boards, induction heating, or with chemical exothermic reactions. This expansion process starts at approximately 150° C. and transitions at higher temperatures into the sintering process which, depending on the composition of the product to be mixed, takes place chiefly at temperatures between 500 and 1000° C., preferably at 680° C. This causes the components of the binder matrix (low-viscosity binder liquid and/or high-viscosity binder granulate) to foam and completely or partially encapsulate the expanded glass granules with a foam-like binder structure. The shaped article thus attains a significantly greater stability as compared, for example, to shaped articles that are bonded with water glass.

If desired, a crystal growth may be performed in the binder matrix in a sub-sequent heat treatment at 700° C., for example, to create a micro-porosity.

The following table shows nine sample batches for various test pieces as an example for the inventive production of sound insulation boards. In these tables,
  coarse-grained granulate means: expanded-glass granulate with a grain size of 1–16 mm, preferably 2–4 mm
  small-grained granulate means: expanded-glass granulate with a grain size <1 mm, preferably 0.25–0.5 mm
  binder granulate means: high-viscosity binder granulate with a viscosity of $\eta=10^{12}$ mPas
  liquid binder means: low-viscosity binder liquid with a viscosity of $\eta=10^3$ mPas The test pieces 1 through 5 contain additional support grain to increase the stability.

| Batches with Support Grain | | | | |
|---|---|---|---|---|
| Test Piece 1 | Test Piece 2 | Test Piece 3 | Test Piece 4 | Test Piece 5 |
| Coarse-grained granulate 2–4 mm 52.5% | Coarse-grained granulate 2–4 mm 52.5% | Coarse-grained granulate 2–4 mm 52.5% | Coarse-grained granulate 2–4 mm 52.5% | Coarse-grained granulate 2–4 mm 52.5% |
| Fine-grain granulate 0.25–0.5 mm 18.8% | Fine-grain granulate 0.25–0.5 mm 15.0% | Fine-grain granulate 0.25–0.5 mm 11.25% | Fine-grain granulate 0.25–0.5 mm 7.5% | Fine-grain granulate 0.25–0.5 mm 3.75% |
| Binder granulate 0.5–1 mm 3.75% | Binder granulate 0.5–1 mm 7.5% | Binder granulate 0.5–1 mm 11.25% | Binder granulate 0.5–1 mm 15.0% | Binder granulate 0.5–1 mm 18.75% |
| Liquid binder $\eta = 103$ mPa * s 25.0% | Liquid binder $\eta = 103$ mPa * s 25.0% | Liquid binder $\eta = 103$ mPa * s 25.0% | Liquid binder $\eta = 103$ mPa * s 25.0% | Liquid binder $\eta = 103$ mPa * s 25.0% |
| Length-specific flow resistance 12 kPa * s/m2 | Length-specific flow resistance 19 kPa * s/m2 | Length-specific flow resistance 34 kPa * s/m2 | Length-specific flow resistance 28 kPa * s/m2 | Length-specific flow resistance 38 kPa * s/m2 |

| Batches without Support Grain | | | |
|---|---|---|---|
| Test Piece 6 | Test Piece 7 | Test Piece 8 | Test Piece 9 |
| Coarse-grained granulate 2–4 mm 67.5% | Coarse-grained granulate 2–4 mm 60.0% | Coarse-grained granulate 2–4 mm 52.5% | Coarse-grained granulate 2–4 mm 45.0% |
| Fine-grain granulate 0.0% | Fine-grain granulate 0.0% | Fine-grain granulate 0.0% | Fine-grain granulate 0.0% |
| Binder granulate 0.5–1 mm 7.50% | Binder granulate 0.5–1 mm 15.0% | Binder granulate 0.5–1 mm 22.50% | Binder granulate 0.5–1 mm 30.0% |
| Liquid binder $\eta = 103$ mPa * s 25.0% | Liquid binder $\eta = 103$ mPa * s 25.0% | Liquid binder $\eta = 103$ mPa * s 25.0% | Liquid binder $\eta = 103$ mPa * s 25.0% |
| Length-specific flow resistance 5 kPa * s/m² | Length-specific flow resistance 18 kPa * s/m² | Length-specific flow resistance 52 kPa * s/m² | Length-specific flow resistance 91 kPa * s/m² |

In summary, shaped articles that are produced on expanded-glass granulate basis with a sintered binder matrix on diatomite basis, as compared to the prior art, which generally reveals only boards that have been dried at lower temperatures, have significantly improved features, such as:
- resistance to pressure and flexural strength
- less water absorption
- water resistance
- improved alkali resistance
- significantly reduced efflorescence
- controllable length-specific flow resistance

What is claimed is:

1. A process for the production of a shaped article from a lightweight-aggregate granulate, and an inorganic binder, comprising the following process steps:
   providing of a viscous binder made of diatomite and caustic soda or caustic potash solution,
   mixing of the binder with lightweight-aggregate granulate,
   shaping of the lightweight-aggregate granulate binder mixture,
   foaming the lightweight-aggregate granulate binder mixture to create a foamed binder matrix by thermally exposing the lightweight-aggregate granulate binder mixture and
   bonding of the lightweight-aggregate granulate particles in said foamed binder matrix to create the shaped article.

2. A process according to claim 1, wherein the viscous binder is prepared by boiling ground diatomite in caustic soda or caustic potash solution.

3. A process according to claim 1, wherein the viscous binder is prepared by dissolving diatomite in water and subsequently adding sodium hydroxide.

4. A process according to claim 1, wherein boric oxide is added during the preparation to the viscous binder.

5. A process according to claim 1, wherein the binder is provided as a low-viscosity binder liquid with a viscosity of approximately 1 to $10^8$ mPas.

6. A process according to claim 1, wherein the binder is provided as a high-viscosity binder granulate with a viscosity greater than $10^8$ mPas that has been prepared by drying and granulating the diatomite batch.

7. A process according to claim 1, wherein the thermal exposure is performed by means of a hot gas treatment.

8. A process according to claim 6, wherein to provide adhesion in a granulate mixture of lightweight-aggregate granulate and binder granulate, one of an inorganic adhesive or the diatomite binder liquid is used.

9. A process according to claim 6, wherein to provide adhesion in a granulate mixture of lightweight-aggregate granulate and binder granulate, an organic adhesive is used.

10. A process according to claim 1, wherein the shaped article is further hardened through thermal exposure under sintering of the foamed binder matrix.

11. A process according to claim 1, wherein at least one of glass powder, finely ground kaolin, zinc oxide and tin oxide are entered as crystal nuclei into the binder.

12. A process according to claim 8, wherein through heat-treatment, micro-crystals are grown from at least one of the amorphous binder matrix and the lightweight-aggregate granulate to generate a micro-porosity in the shaped article.

13. A process according to claim 10, wherein the sintering or heat-treatment are performed at temperatures between 500 and 1000° C.

14. A process according to claim 1, comprising the following content percentage limits of the individual components:
   foamed glass granulate in a grain size of 0 to 16 mm: 30 to 95 wt. %
   high-viscosity binder granulate with solids content 50 to 90% and grain size of 0 to 10 mm: up to 70 wt. %
   low-viscosity binder liquid with solids content 5 to 50%: up to 50wt. %.

15. A process according to claim 1, wherein the lightweight-aggregate granulate binder mixture is compacted after or during the shaping with a compaction pressure of 0.1 to 10 $N/mm^2$.

16. A process according to claim 1, wherein the shaping of the lightweight-aggregate granulate binder mixture takes place by one of filling it into a mold, by extrusion, and pressing by means of a sliding press.

17. A process according to claim 1, wherein the foaming of the binder takes place starting at approximately 150° C.

18. The process of claim 10 wherein said sintering is dry sintering.

19. The process of claim 13 wherein the sintering is performed at a temperature between 680 and 700° C.

20. The process of claim 1 wherein said lightweight aggregate granulate is an expanded glass granulate.

* * * * *